United States Patent
Vukicevic et al.

(10) Patent No.: US 10,891,022 B2
(45) Date of Patent: Jan. 12, 2021

(54) SYSTEM AND METHOD FOR INTERFACING WITH A DISPLAY DEVICE

(71) Applicant: NETGEAR, Inc., San Jose, CA (US)

(72) Inventors: Vladimir Vukicevic, New York, NY (US); Or Baron, New York, NY (US); Jerry Hu, New York, NY (US); Jordan Cooperman, Brooklyn, NY (US)

(73) Assignee: NETGEAR, INC., San Jose, CA (US)

( * ) Notice: Subject to any disclaimer, the term of this patent is extended or adjusted under 35 U.S.C. 154(b) by 0 days.

(21) Appl. No.: 16/189,569

(22) Filed: Nov. 13, 2018

(65) Prior Publication Data

US 2019/0079647 A1    Mar. 14, 2019

Related U.S. Application Data

(63) Continuation-in-part of application No. 14/673,927, filed on Mar. 31, 2015.
(Continued)

(51) Int. Cl.
| | |
|---|---|
| H04N 1/00 | (2006.01) |
| G06F 3/0482 | (2013.01) |
| G06F 3/01 | (2006.01) |
| G06Q 20/40 | (2012.01) |
| G06F 3/0481 | (2013.01) |

(Continued)

(52) U.S. Cl.
CPC .......... *G06F 3/0482* (2013.01); *G06F 1/1626* (2013.01); *G06F 1/1684* (2013.01); *G06F 1/1686* (2013.01); *G06F 1/1694* (2013.01); *G06F 3/011* (2013.01); *G06F 3/017* (2013.01); *G06F 3/04817* (2013.01); *G06F 3/04883* (2013.01); *G06K 9/00335* (2013.01); *G06K 9/00677* (2013.01); *G06Q 20/40* (2013.01); *G06Q 50/01* (2013.01);
(Continued)

(58) Field of Classification Search
None
See application file for complete search history.

(56) References Cited

U.S. PATENT DOCUMENTS

| | | | | |
|---|---|---|---|---|
| 2013/0204457 A1* | 8/2013 | King | ...................... | B60K 28/06 701/1 |
| 2013/0239063 A1* | 9/2013 | Ubillos | ................... | H04L 51/24 715/838 |

(Continued)

*Primary Examiner* — Matthew Salvucci
(74) *Attorney, Agent, or Firm* — Bechen PLLC; Timothy J. Bechen

(57) ABSTRACT

The present method and system provides for interacting with a display device including accessing an external content database having images stored therein, and storing a plurality of the images to a local memory device associated with the display device and therein displaying one or more of the images on an output display. The method and system includes displaying a user interface screen on the output display of the display device and detecting, via at least one of a plurality environmental sensors, a user gesture external to the display device, the user gesture relating to gesture-based control of the display device. The method and system determines a gesture context value relating to the detected gesture and accesses a gesture library to retrieve an interface command. The method and system thus updates the output display of the at least one of the plurality of images based on the interface command.

18 Claims, 10 Drawing Sheets

Related U.S. Application Data

(60) Provisional application No. 62/586,374, filed on Nov. 15, 2017, provisional application No. 61/972,643, filed on Mar. 31, 2014.

(51) Int. Cl.
  *G06K 9/00* (2006.01)
  *G06F 3/0488* (2013.01)
  *G06Q 50/00* (2012.01)
  *G06F 1/16* (2006.01)

(52) U.S. Cl.
  CPC ... *H04N 1/00835* (2013.01); *G06F 2203/011* (2013.01); *G09G 2360/14* (2013.01)

(56) References Cited

U.S. PATENT DOCUMENTS

2014/0337151 A1* 11/2014 Crutchfield ........... G06F 1/1601
  705/17
2015/0077326 A1* 3/2015 Kramer ................ G06F 3/0325
  345/156

* cited by examiner

SYSTEM AND METHOD FOR INTERFACING WITH A DISPLAY DEVICE

RELATED APPLICATIONS

The present application relates to and claims priority to U.S. Provisional Patent Application Ser. No. 62/586,374 filed Nov. 15, 2017. The present application is also a continuation-in-part of and claims priority to U.S. patent application Ser. No. 14/673,927 filed Mar. 31, 2015 entitled "SYSTEM AND METHOD FOR OUTPUT DISPLAY GENERATION BASED ON AMBIENT CONDITIONS," which relates to and claims priority to U.S. Provisional Patent Application Ser. No. 61/972,643 filed Mar. 31, 2014.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The disclosed technology relates generally to graphical display technology and more specifically to determining environmental factors and generating an output display based on the environmental factors.

BACKGROUND

Existing technology provides for digital picture frames looping electronic images. These digital picture frames include a small microprocessor with limited processing technology and a memory device. The microprocessor includes functionality for advancing and transitioning between images.

Advancements in the digital picture frame technology include improvements in loading images into the local memory. For example, current techniques allow for wireless connectivity, such as a Bluetooth connection, for the uploading of images. In another embodiment, the connectivity may allow for the streaming of content onto the screen using an active network connection.

Where a digital picture frame is a smaller screen, a flat screen television is more commonly available. Flat screen televisions, when idle, can serve as an electronic canvas such as using screensaver technology.

The growth of smart television technology further enhances the ability to stream and provide content to an idle television screen. This technology may be embedded within processing technology of the television itself or can be enhanced or supplemented by a connected device. Where a smart television includes functionality for wireless connectivity to the Internet, this allows for a user to access Internet-based content for display on the screen.

Similarly, connected technology allows for the importation of content for display on the screen. One example is an AppleTV® available from Apple, Inc. of Cupertino Calif. This product connects via a USB connection and receives content via either a local computer or direct connection to the Internet. Via the USB-connected device, the user can load content onto the screen.

Existing technology suffers from a disconnect between environmental factors/conditions and output content. The output on an electronic screen is predicated on the user's select engagement of content. Thus, existing display technology is based on user selection of content.

One form of technology using sensors for display adjustment is a reactive technology for adjusting the quality of content, not the content. Adaptive brightness systems determine the brightness of a particular room and automatically adjust the brightness level of the television display. This adjustment does not relate to type of content, but makes existing content more visible.

Digital display technology suffers from limited techniques for user interfacing. Techniques include touch-screen technology, buttons on a frame or a combination of external buttons and menu(s) that pop-up on the display. Another technique is using a remote control with directional buttons.

Existing techniques for user interfacing suffer from needing either external buttons, touch screen technology, or an external device synched with the display. As such, there is a need for improved user interfacing with a display device.

BRIEF DESCRIPTION

The present method and system provides for interacting with a display device including accessing an external content database having images stored therein. The stored images are images for being displayed on the display device, such as collections of works of arts, photography, or any other visual content.

The method and system includes storing a plurality of the images to a local memory device associated with the display device and therein displaying one or more of the images on an output display. For example, the external storage device may store a large collection of images of Pre-Raphaelite paintings. A selection of these Pre-Raphaelite paintings can be downloaded and stored on the local memory, and shown on the display in rotation, such as for example cycling through to displaying each image individually for 60 seconds.

The method and system includes displaying a user interface screen on the output display of the display device. The user interface display can be in an overlay and allowing for user navigation of interfacing functionality.

The method and system thereby detects, via at least one environmental sensor, a user gesture external to the display device, the user gesture relating to gesture-based control of the display device. For example, the user gesture can be a swipe of a hand in front of the sensor.

Thereby, the method and system determines a gesture context value relating to the detected gesture, the gesture context value determined based on the user interface screen. For example, the same user-generated gesture can have different meanings based on the menu/sub-menu location of the user interface display.

The method and system provides for access a gesture library using the gesture context value to retrieve an interface command. The gesture context value provides for clarifying the context of the user gesture based on the interface menu options available to the user. The method and system thus updates the output display of the at least one of the plurality of images based on the interface command.

A better understanding of the disclosed technology will be obtained from the following detailed description of the preferred embodiments taken in conjunction with the drawings and the attached claims.

DETAILED DESCRIPTION

Figure 1:
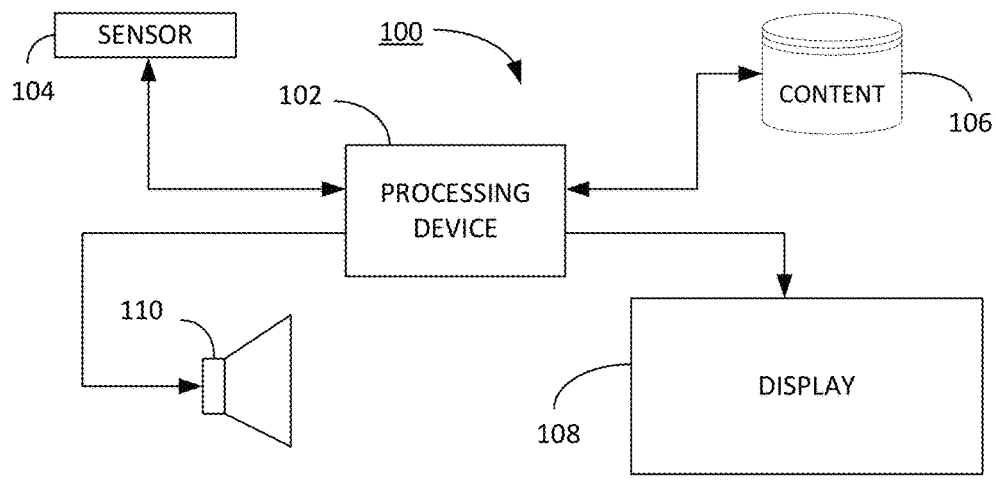
FIG. 1 illustrates a block diagram of a processing system including a display device for generating a display based on ambient conditions.

FIG. 1 illustrates a system 100 including a processing device 102, an environmental sensor 104, database 106, a display 108 and a speaker 110. It is recognized by one skilled in the art, numerous elements known in the art have been omitted for clarity purposes only, for example a power source or connectivity components.

In this embodiment of the system 100, the processing device 102 may be any suitable type of processing device operative to perform processing operations, such as in response to executable instructions. The executable instructions may be stored on a computer readable medium, not expressly illustrated herein. The processing device may be a stand-alone processing component, or operations may be performed in a distributed processing environment. The illustrated processing device 102 represents one or more physical components for performing processing operations as described herein.

The sensor 104 may be any suitable type of sensor allowing for detecting of ambient conditions. As described in further detail below, different sensors provide for detection of different ambient conditions. For example, the environmental sensor may include, but is not limited to, a camera, a motion detector, a light detector, an audio detector and/or microphone, a heat sensor, a wireless signal detector, a Bluetooth signal detector, an electric field sensor for proximity detection and/or gesture-based control, an infrared-based sensor for ambient light detection and/or proximity detection and/or gesture-based control, an ultrasonic transducer sensor for proximity detection and/or gesture-based control, geospatial and/or global positioning sensor, The database 106 may be any suitable memory storage device or devices capable of storing content therein. Illustrated in FIG. 1, the database 106 is directly connected to the processing device 102, such as being embedded or mounted in a processing system. Such illustration is not expressly limiting as the database 106 may be connected via alternative means, such as via a wired or wireless connection, such as a memory device connected via a portal or peripheral connection outlet, a local data storage device accessible via wired or wireless connectivity, or in another embodiment a storage device associated with or internal to another processing device, e.g. smart phone, tablet computer, laptop computer, capable of communication with the processing device 102. For example, the storage 106 may include content such as images, audio files, movies files, etc., stored on a person's mobile device such that the processing device can access and retrieve the content therefrom. In another embodiment, images may be stored on a memory card insertable into the frame. In another embodiment, the images may be stored on an external server and accessed via a wireless connection.

The display device 108 may be any suitable display device, including but not limited to a flat screen television or display consistent with known display technology. The display device 108 may also be a smaller picture frame, such as an electronic picture frame, having the processing device 102 associated therewith.

The speaker 110 may be any suitable speaker and or audio output system recognized by one skilled in the art. The speaker 110 may be part of an audio system or can be an embedded speaker associated with the display 108.

In one embodiment, as described in further detail below, the system 100 may include a central housing having the various elements disposed therein. In further embodiments, different components including the sensor 104, database 106, processor 102, speaker 110 and/or display 108 may be external to the system 100 and engaged via a wired or wireless connection. For example, the functionality of the processing device 102 may be disposed in a remote processor with output functionality to the display 108 via a wireless peripheral-connection device.

In the system 100, the sensor 104 operates to detect ambient conditions. Ambient conditions generally relate to conditions of the environment relative to the sensor and/or display 108. Ambient conditions can include any relevant conditions that can be measured by one or more sensors. For example, an ambient condition may be the number of people within a room and the activity level of those people. This can be determined using a camera or a camera in combination with a motion detector. This can also be determined using a microphone or other audio detection device to determine a number of different voices. The system 100 may use any suitable number of sensors, including a single sensor 104 in one embodiment and other embodiments with multiple sensors 104, even different types of sensors.

Based on the detection of ambient conditions, the processing device 102 therein performs processing operations to determine ambient condition factors. These ambient condition factors represent estimations of activities or conditions relative to the display 108.

Environmental sensor(s) 104 provide inputs for determining ambient factors based on detecting ambient conditions. Examples of ambient condition factors include but are not limited to quantity of viewers, identity of viewers, viewer proximity, viewer motion, viewer gesture, viewer mood, human sounds, ambient sounds, musical sounds, light quantity, light source, light direction, local temperature, geographic location, etc.

Each ambient condition factor can be informed by one or more of the above specified sensors detecting ambient conditions. The determination of an ambient condition factor can be based on the analysis of the ambient condition.

For example, an ambient condition factor may possess a range of output values that determine the definition of ambient conditions. An example value range for the quantity of viewers may include '1', '2', '3', '4', '5', '6', '7', '8', and '9-or-more' output values. An example value range for the identity of viewers may include 'owner #1', 'owner #2', 'owner #3', 'owner #4', 'owner #5', 'owner #6', 'owner #n+#n', 'multiple owners', 'guest #1', 'guest #2', 'multiple guests', and 'owners+guests' output values. An example value range for the viewer motion ambient factor may include 'none', 'light', 'medium', and 'heavy motion' output values. An example value range for the light quantity ambient factor may include 'none', 'very low', 'low', 'medium', 'high', and 'very high' output values. An example value range for the musical sounds may include 'none', and 'unknown', 'recognized song match' output values. There are numerous other potential ambient conditions and associated ambient condition factor value ranges informed by the various embodiments and combinations of environmental sensors 104.

Based on these ambient condition factors, the processing device therein estimates an ambient condition. Each ambient condition may be informed by one or more ambient factor value ranges. An example of ambient condition 'owner default interacting' would be informed by ambient factors 'quantity of viewers', 'identity of viewers', 'viewer proximity', 'viewer gesture', and potentially more ambient factors. An example of ambient condition 'mixed default party active' would be informed by ambient factors 'quantity of viewers', 'identity of viewers', 'viewer proximity', 'viewer motion', 'viewer gesture', and potentially more ambient factors. An example of ambient condition 'owner mood positive' would be informed by ambient factors 'quantity of viewers', 'identity of viewers', 'viewer proximity', 'viewer gesture', 'viewer mood', and potentially more ambient factors. An example of ambient condition 'two owners recognized song' would be informed by ambient factors 'quantity of viewers', 'identity of viewers', 'viewer proximity', 'viewer gesture', 'musical sounds', and potentially more ambient factors. An example of ambient condition 'mixed owner winter night in New York' would be informed by ambient factors 'quantity of viewers', 'identity of viewers', 'viewer proximity', 'viewer gesture', 'light quantity', 'light source', 'local temperature', 'geographic location' and potentially more ambient factors. There are numerous other potential ambient conditions informed by associated ambient factors informed by the various embodiments and combinations of sensors 104.

In the above example, the large number of individuals in the room and the high ambient noise allows for the processing device to estimate that there is a social gathering in the room, e.g. mixed default party active. Therefore, the processing device, via its operating routine, retrieves video display content consistent with the estimated ambient condition, which in this case may be a selection of images stored in the database 106. In one embodiment, a user may preload images within the database 106 including tags or other identifiers usable for selection based on determined ambient conditions.

It is noted, further exemplary embodiments are described herein, including further embodiments with sensors 104 and ambient conditions.

Figure 2:
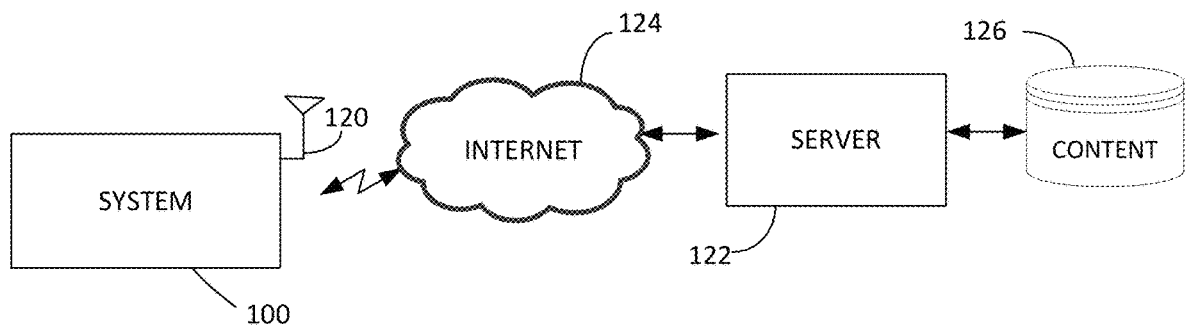
FIG. 2 illustrates a block diagram of a processing system of FIG. 1 in networked communication.

Whereas FIG. 1 illustrates an inclusive system 100, FIG. 2 illustrates the system 100 having networked connection. In FIG. 2, the system 100 includes a wireless transmitter 120 for communication with a server 122 via a networked connection 124, such as the Internet. The server 122 is connected to a network database 126.

The connectivity of FIG. 2 is illustrated as wireless via transmitter/receiver 120, but it is recognized that wired connectivity to a router is within the scope of the system and method. Furthermore, the connectivity of FIG. 2 is not expressly restricted to a direct connection from the system 100, as routing of Internet-based connectivity may be between a local wireless router, a base station, a private network or any other suitable means.

The server 122 may be any suitable network-based processing system accessible via a networked connection. Such connectivity may include login or authentication operations, consistent with techniques recognized by those skilled in the art. The server 122 may include functionality described above regarding processing device 102, such that the processing operations are offloaded to a processor associated with the server 122. The server 122 may include one or more processing devices in a centralized or distributed processing environment.

The database 126 may be one or more data storage devices accessible via the networked connection. The database 126 may include data storage associated with a particular user, or in another embodiment may be a generalized content database or databases. Whereas in FIG. 1 the content for output via the display 108 and/or speaker 110 is retrieved from the local storage 106, the network storage 126 may include a larger library of content. Such content may be user-specific or may be sponsored or directed content. For example, if the ambient conditions indicate a social gathering, the display content may include advertisements for an upcoming festival, concert, event, etc.

The content may also be from public sources, such as content retrieved via tags or metadata associated with the content. For example, the content may be images retrieved from a photo-sharing website or network, audio may be retrieved from a streaming audio service.

FIG. 2 illustrates the embodiment wherein the display system 100 utilizes network interactivity to expand on the content selected and available for display on the display 108 of FIG. 1.

Figure 3:
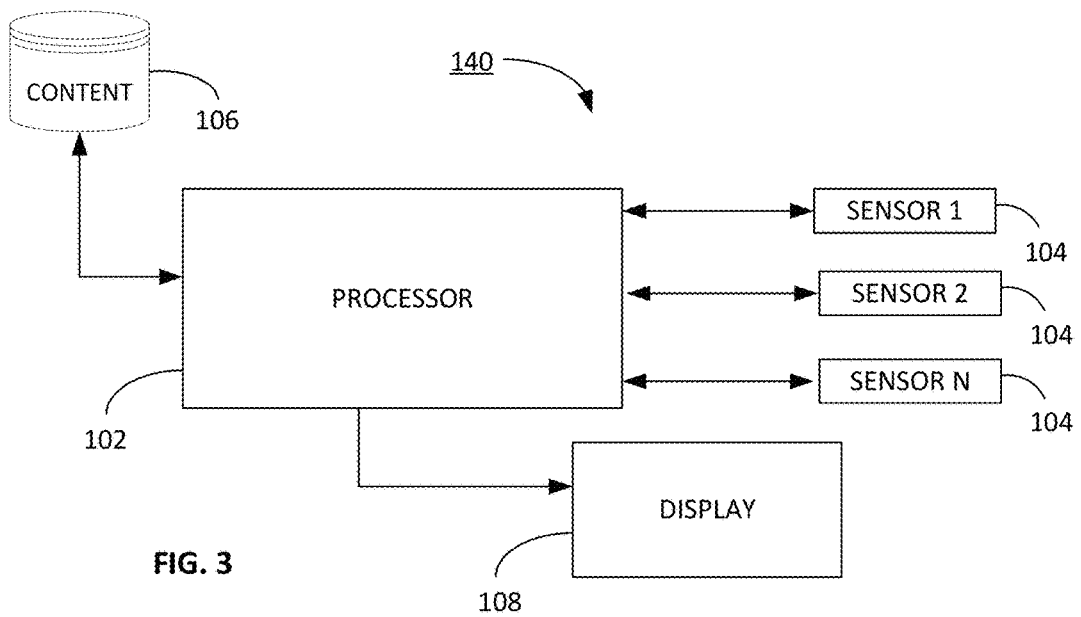
FIG. 3 illustrates a block diagram of one embodiment of a display device processing system.

Whereas the system 100 of FIG. 1 illustrates one sensor 104, FIG. 3 illustrates another embodiment having N number of sensors, where N is an integer value. The system 140 of FIG. 3 includes the processor 102, database 106, display 108, speaker 110 and sensors 142, 144 and 146.

As noted above, the sensor 142, 144 and/or 146 may be any suitable sensor usable to detect ambient conditions. The processor 102, having multiple sensors 142-146 further operates to compile the sensor data to enhance the accuracy of the ambient condition detection. In the above example, the sensor 142 may be a camera detecting five separate individuals in the room and sensor 144 may be a microphone to detect the volume level. Sensor 146 may be a wireless sensor to detect a number of connected devices and determine identity information of people in the room based on the connected device.

In this exemplary embodiment, the connected device may be a smartphone having a social networking application accessible via the smartphone. The sensor 146 may detect the presence of the smartphone based on the smartphone generating a Bluetooth signal or the device seeking wireless connectivity with a local wireless router. Based on proper permissions, the sensor 146 may therein determine the user's identity on a social networking site and access information may available on the social network site. One example may be accessing photos or status updates the user has shared on the site. Another example may be detecting a mood of the user based on any recent posts, including these as ambient conditions.

Figure 4:
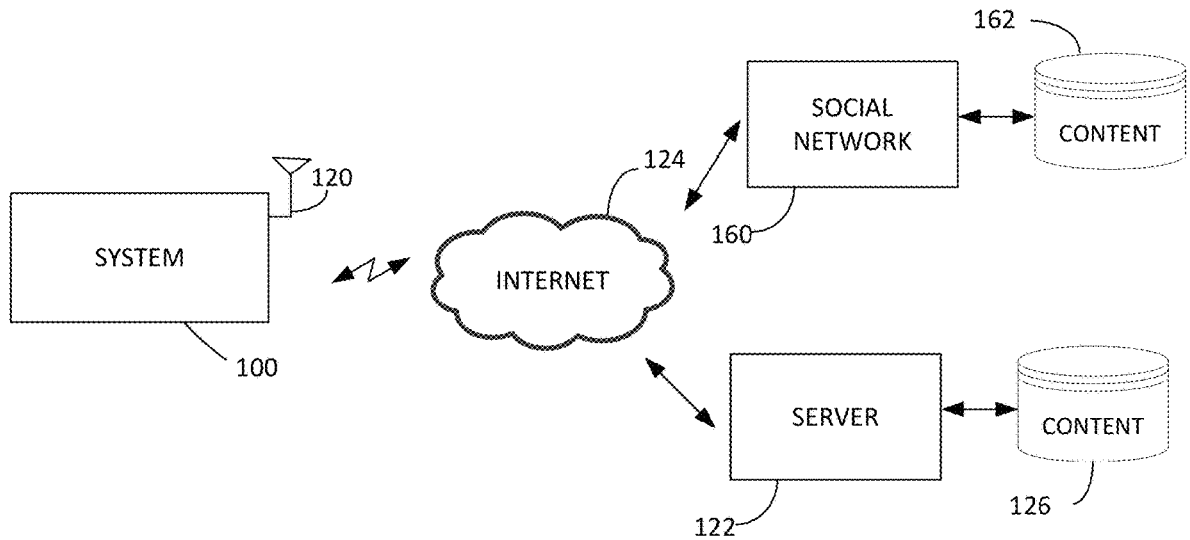
FIG. 4 illustrates another embodiment of a processing system in networked communication.

FIG. 4 illustrates one embodiment of a system for accessing content via a social network. In addition to the system 100 accessing the content server 122 and content database 126 via network 124, FIG. 4 includes a social network 160 having a content database 162 associated therewith.

The social network 160 may be any suitable web-based social networking or content distribution system. The network 160 may include social websites where users post images and/or status updates in a news feed, may include a system where users distribute short messages, may include a system where users submit and distribute images only, where users distribute blogs or other content, by way of example. The network 160 includes a database 162 having content associated therewith, typically associated with a user or tagged content. For example, where a user has a profile on a network site, the database 162 includes the content associated with the profile.

Where permission for content is made available from a user or based on permission levels, the system 100 may therein access and retrieve content for display. In another embodiment, the system 100 having knowledge of a user based on one or more sensors, may use the social network content as another form of to determine ambient condition factors. For example, if a camera as a sensor employs facial recognition and recognizes a user, such as the owner of the system 100, and includes permissions for accessing a social network, the processing device 102 may acquire status information as an ambient condition factor. For example, if the user updates a status to indicate as being recently engaged, this can be an ambient condition whereby the visual display content may include content relating to wedding interests.

Figure 5:
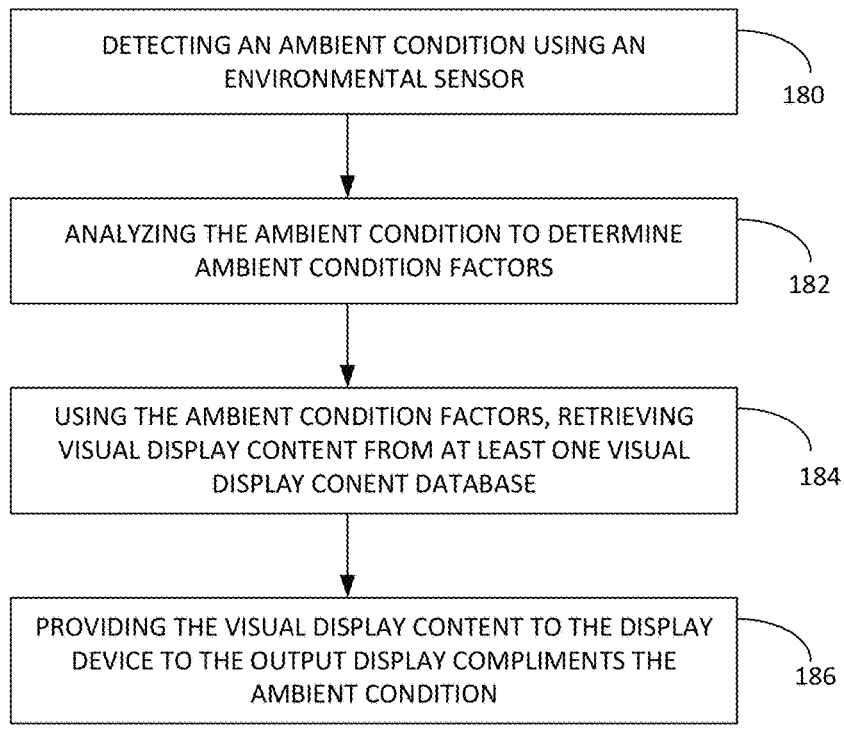
FIG. 5 illustrates a flowchart of the steps of one embodiment of a method for generating an output display on a display device based on at least one ambient condition.

The processing 102 of the system 100 including functionality performed by one or more processing devices. FIG. 5 illustrates the steps of one embodiment of the methodology, as performed by the physical electronic processing devices of FIGS. 1-4.

In the method, a first step, step 180, is detecting an ambient condition using an environmental sensor. This may include sensors 104 as described above. Similarly, the environmental sensor may include processing operations performed by the processor 102 in acquiring information via available sources, such as the networked communication of FIG. 4.

A next step, step 182, is analyzing the ambient condition factors to determine ambient condition. Examples of ambient factors include but are not limited to quantity of viewers, identity of viewers, viewer proximity, viewer motion, viewer gesture, viewer mood, human sounds, ambient sounds, musical sounds, light quantity, light source, light direction, local temperature, geographic location, etc. Each ambient factor can be informed by one or more of the above specified sensors. Based on these ambient condition factors, the processing device therein estimates an ambient condition. Each ambient condition may be informed by one or more ambient factor value ranges.

Step 184 is, using the ambient condition factors, retrieving visual display content from at least one visual content database. As described above, the visual content database may be a local database 106 or can be a network-accessible database 126. The content can be images, videos, advertisements, text, audio or any other suitable content. Content is either automatically or manually tagged with appropriate ambient condition tags. Content is selected for display based on the matching of ambient condition tags with the determined ambient condition.

Step 186 is providing the visual display content to the display device so that the output display compliments the ambient condition. For example, with reference to FIG. 1, the output is displayed on the display 108, which may include audio via the speaker 110. If the ambient conditions detect a single person in the room, the room being dark and no or little movement, the output display may be soothing image with soft music associated with the image, as an example.

Figure 6:
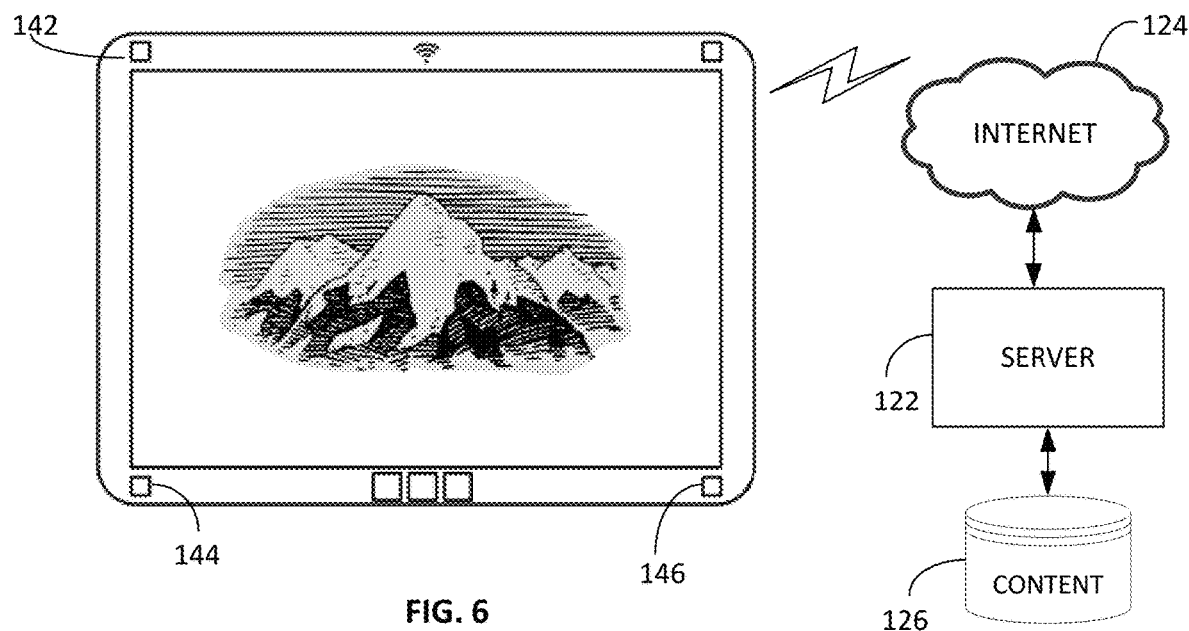
FIGS. 6-9 illustrate representative displays of various embodiments of a display device providing an output based on at least one ambient condition.

FIG. 6 illustrates a graphical display of a display device including multiple sensors, such as noted sensors 142, 144 and 146. Further sensors are within the scope of the display device. The device further includes a wireless connector for connecting to the server 122 via the Internet 124. In this embodiment, the server 122 performs processing operations for determining content from database 126 based on the sensor 142, 144 and/or 146 input. In this embodiment, the sensors may detect little movement, thus proposing a soothing image of a mountain scene.

Another embodiment is using a light sensor, such as detecting brightness, light sources, and/or light consistency from stimuli within the environment of the hardware. Based on light factors, the system leverages local and/or server-stored software to adjust the brightness, contrast, and other display factors in the entire display.

Another embodiment of the sensor data relates to motion detection for detecting motion, shape, and/or size of objects within the environment. Based on motion factors, the system leverages local and/or server-stored software to display environmentally relevant content, e.g. a more soothing and calm image if the environment has little or no motion, a more vibrant and action-filled image if the room is full of multiple motion sources, etc.

Figure 7:
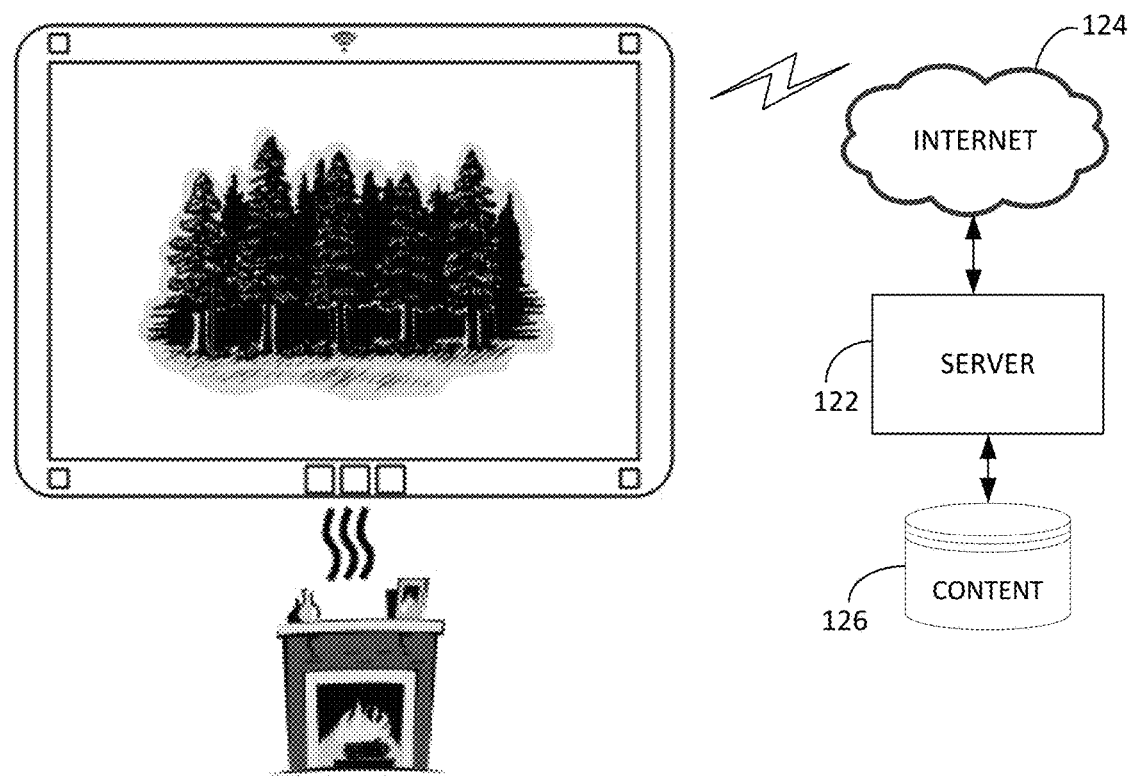
Figure 8:
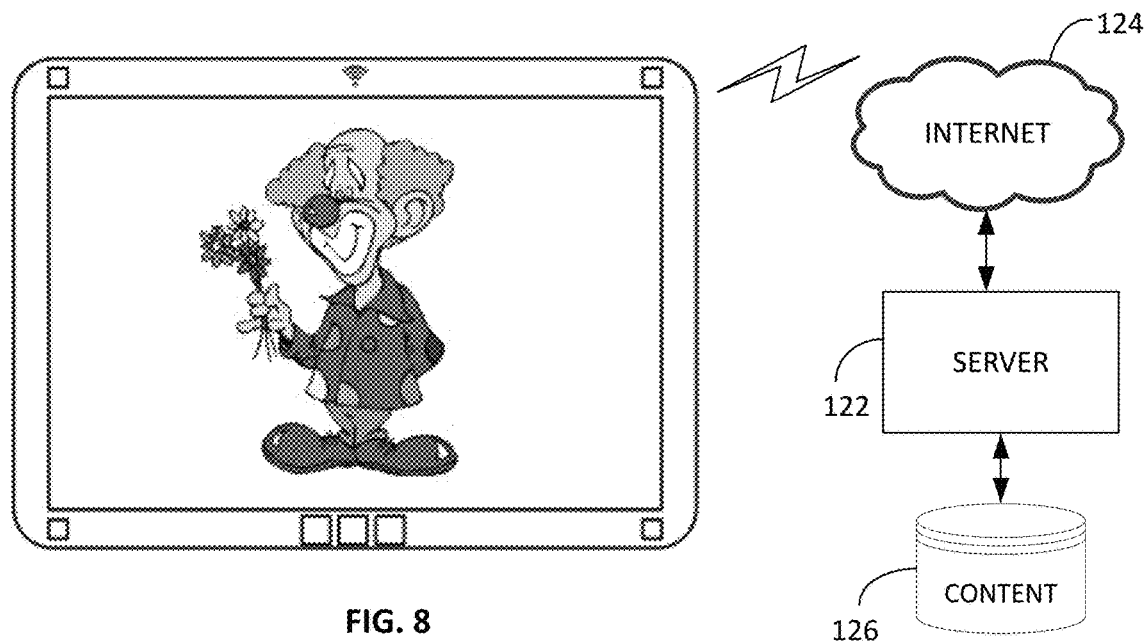

FIG. 7 is a visual representation of the intelligent system for displaying digital visual content responding to heat-based environmental stimuli. In this scenario, the system includes one or more heat sensors for detecting heat sources and temperature within the environment of the hardware. Based on heat factors, the system leverages local and/or server-stored software to adjust the brightness, contrast, and other display factors in the entire display.

FIG. 6 is a visual representation of the intelligent system for displaying digital visual content responding to mood-based environmental stimuli—i.e. the digital footprint associated with viewer. In this scenario, the system includes capability to collect and interpret mood, emotion, sentiment, intent, and other personal characteristics based on the internet-connected applications utilized by the viewer—e.g. social media software as described above.

Based on social factors, the system leverages local and/or server-stored software to adjust the brightness, contrast, and other display factors in the entire display. The system is further operative to, based on social factors, the leverage local and/or server-stored software to display environmentally relevant content—e.g. a more soothing and calm image if the viewer is expressing anxiety, a more uplifting and positive image if the viewer is expressing sadness, etc. Similarly, the system may acquire content for display based on the social media content available.

Figure 9:
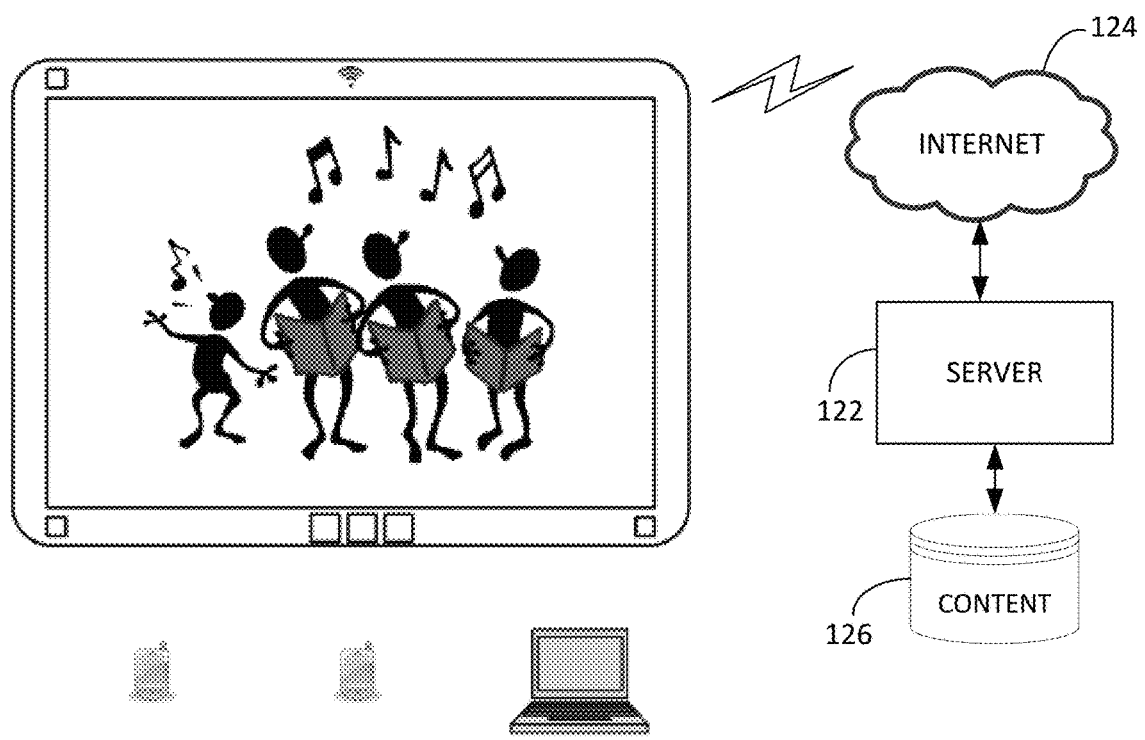

FIG. 9 is a visual representation of the intelligent system for displaying digital visual content responding to multiple devices—i.e. internet-connected stimuli. In this scenario, the system includes capability to recognize and count the number of connected devices within the environment. Based on these devices, the system can determine environmental conditions, such as the number of individuals in the environment, the mood of the users such as via social media, or other factors usable for selecting content.

Figure 10:
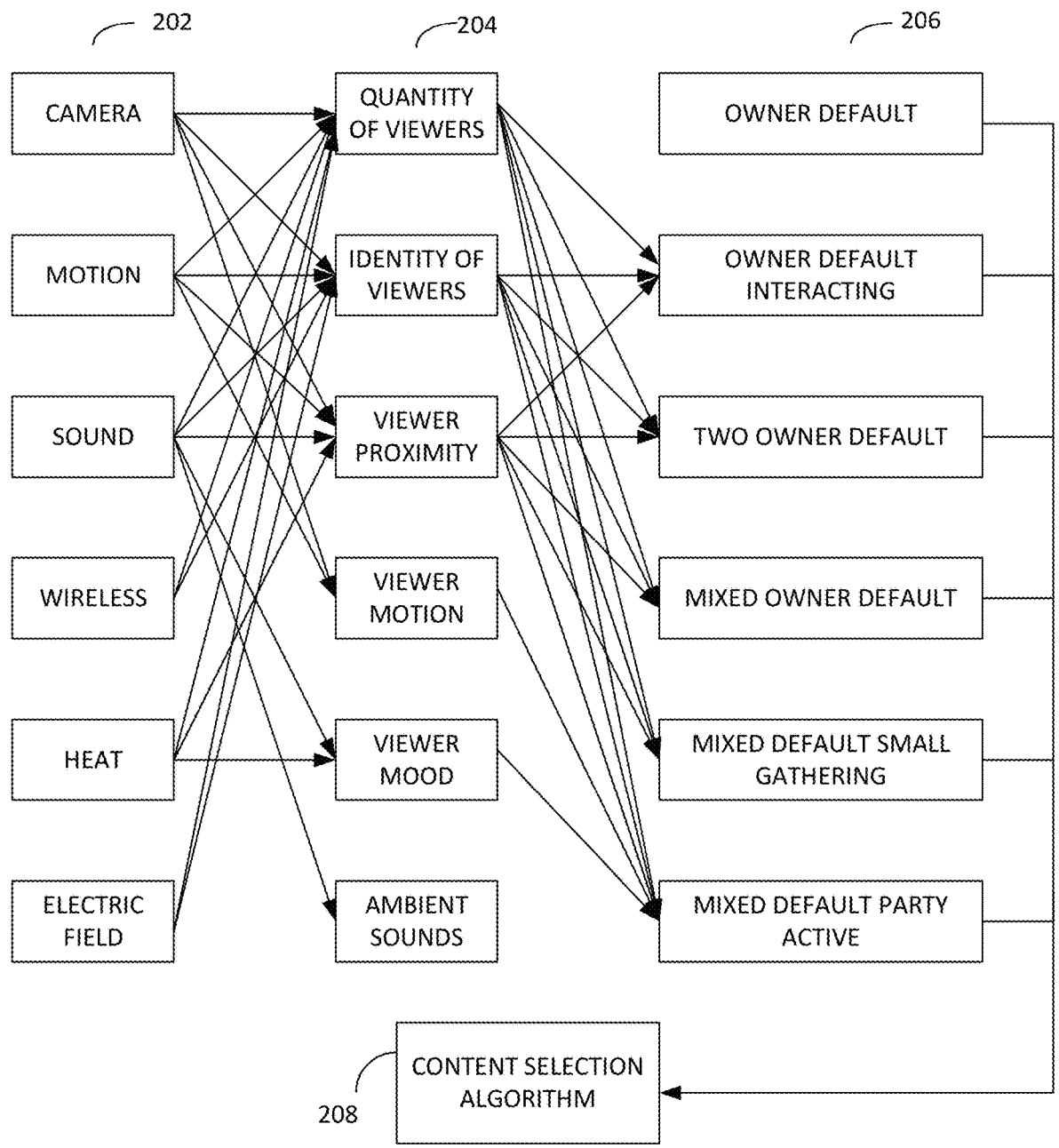
FIG. 10 illustrates a data flow diagram of determining ambient condition factors.

FIG. 10 is a data flow diagram illustrating multiple embodiments of the visual display content selection based on ambient condition factors determined by ambient conditions detected by environmental sensors. The data flow diagram illustrates multiple embodiments, wherein it is recognized these embodiments are illustrative in nature and not limiting in scope. In the example of FIG. 10, there are six exemplary environmental sensors 202: camera; motion; sound; wireless; heat; and electric field. Other examples of sensors include, but are not limited to: light sensor; infrared; ultrasonic, geospatial, and Internet sensors.

The environmental sensors 202 detect ambient conditions using the sensor technology. The data flow diagram of FIG. 10 shows multiple embodiments of the ambient conditions 204 relating to ambient condition factors 206. FIG. 10 illustrates exemplary ambient conditions 204: quantity of viewers; identity of viewers; viewer proximity; viewer motion; viewer mood; and ambient sounds. Other examples ambient conditions include, but are not limited to: viewer gestures; human sounds; musical sounds; light quantity; light source; light direction; local temperature; and geographic location.

Based on these ambient conditions 204, the data flows to one or more ambient condition factors 206, usable for the retrieval of visual display content. Ambient condition factors 206 include, but are not limited to: owner default; owner default interacting; two owner default; mixed owner default; mixed default small gathering; mixed default party active. Other examples include, but not limited to: default condition; owner mood positive; owner mood negative; two owners recognized song; mixed owner winter night in New York, etc.

The ambient condition factors 206 are then usable by the content selection algorithm 208 as noted in the data flow diagram.

One exemplary embodiment illustrated in FIG. 10 includes a motion sensor detecting four ambient conditions: (a) a quantity of viewers; (b) the identity of viewers; (c) proximity of viewers; and (d) the motion of viewers. The electric field sensor detects: (a) quantity of viewers; and (b) the identity of viewers. The ambient conditions are then usable for the determination of the ambient condition factor, such as the ambient condition factor of "two owner default" is based on the ambient conditions of: (a) quantity of viewers; (b) identity of viewers; and (c) viewer proximity.

Figure 11:
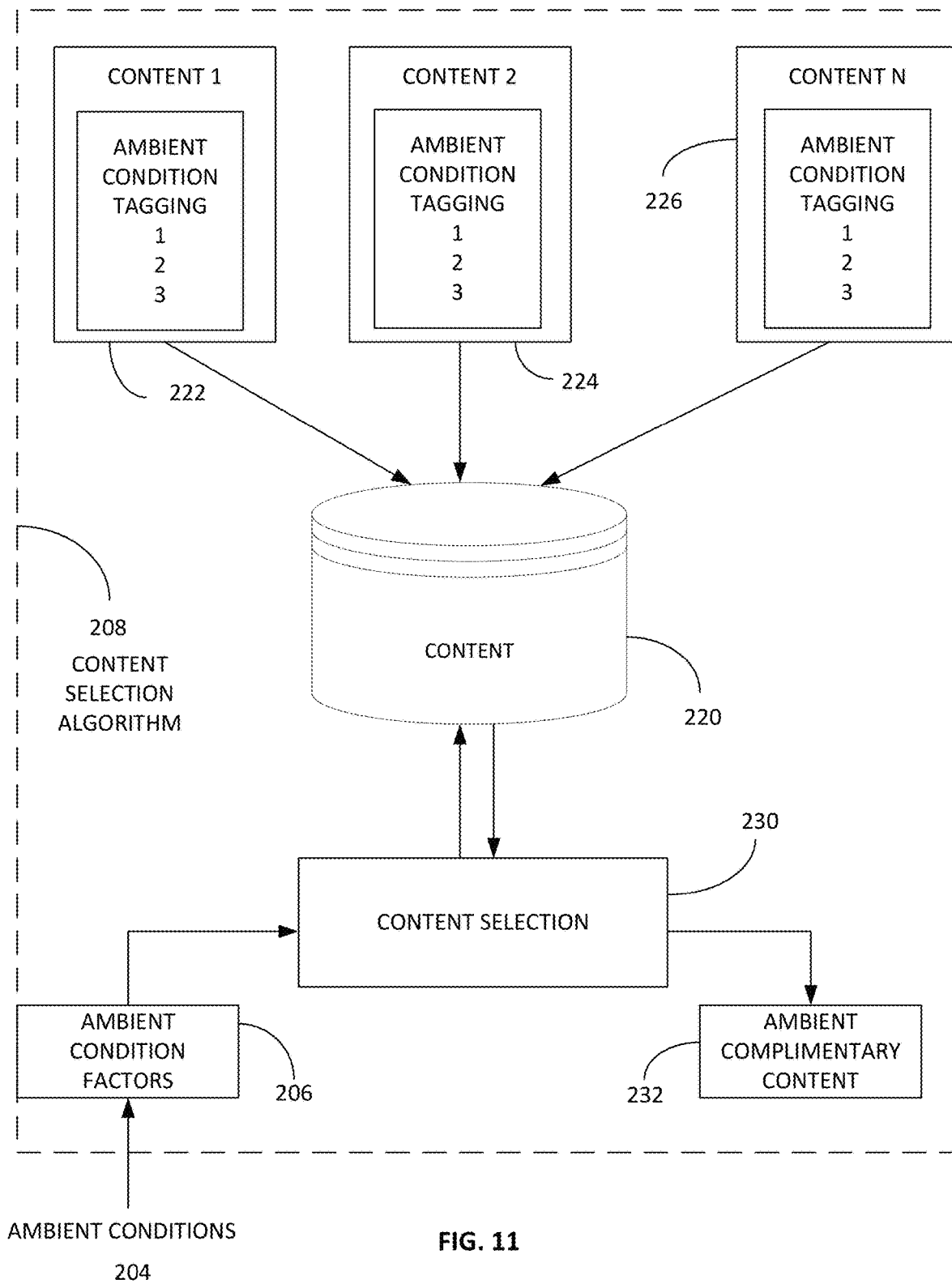
FIG. 11 illustrates a block diagram of one embodiment of a content selection algorithm.

FIG. 11 illustrates one embodiment of the content selection algorithm 208 of FIG. 10. The content selection algorithm operates with a content database 220, the content database including a plurality of content items 222, 224 and 226 by way of example. The content items can include audio and/or video output for display on the display device. For example, the content items may be images and music to compliment the ambient condition of the room as noted by the sensors.

The content itself includes tagging information usable for content selection. In this examples, content 1 222 includes ambient condition tagging 1, 2, and 3. The tags relate to the ambient conditions 206 of FIG. 5, such that the content 222 is usable for designated ambient condition factors. For example, content 1 222 may be designated usable for owner default, two owner default and mixed default small gathering.

A content selection operator 230 received ambient condition factors 206 that are based on the ambient conditions 204. The content selection operator 230 uses the factors 206 in coordination with the content database 220 to retrieve the appropriate content 222, 224 and/or 226. Once this content is received, the ambient complimentary content 232 is therein provided as an output to the display device noted above.

The system for intelligently receiving and displaying digital visual content has the capability to combine the information presented via one or more of the hardware sensors and software sources in any permutation and combination in order to present digital visual content in an environmentally optimized and relevant manner.

Figure 12:
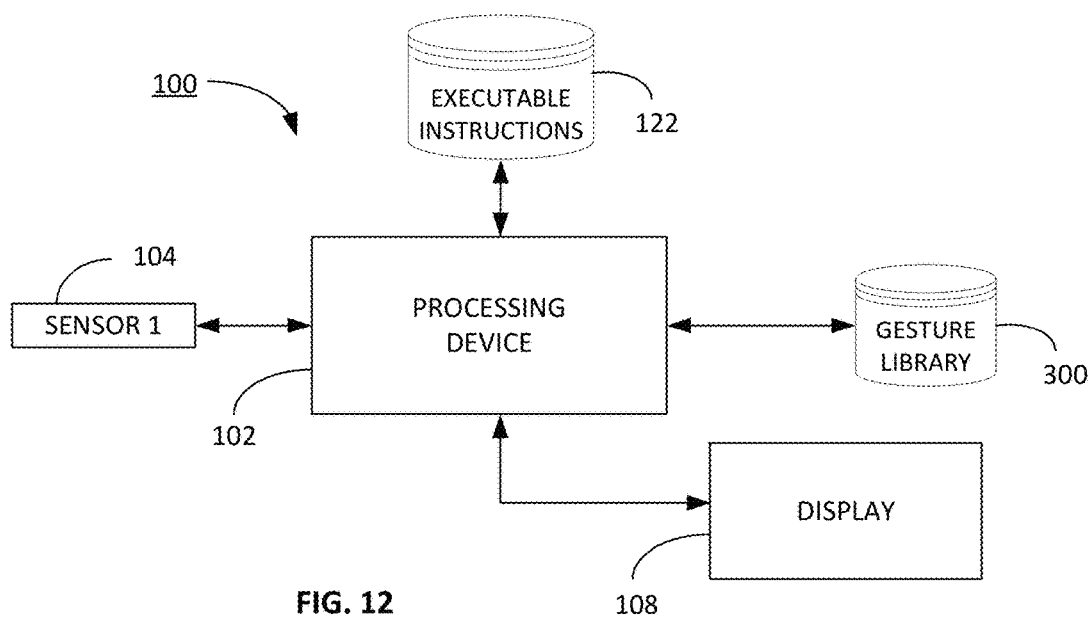
FIG. 12 illustrates a processing device in response to gesture controls.

For further clarity, FIG. 12 illustrates a further embodiment including the processor 102 receiving input from the sensor 104, and in communication with a gesture library 300, as well as a storage medium having executable instructions stored thereon. The processing device 102 further communicates with the display device 108 for providing a visual output to the user creating the gesture.

The processing device 102 operates similar to operations of processing device 102 of FIGS. 1-2 and others, above.

The sensor 104 operates to detect user gestures. These gestures provide for interaction with the processor 102 via the display 108. The sensor 104 detects user gestures using techniques. The sensor 104 detects user gestures using techniques specific to the sensor itself. For example, a camera may include image recognition, an electric field sensor detects movement based on changes in an electric field, an IR sensor detects movement based on change in lighting, etc.

The processing device 102, in response to executable instructions, receives a hand gesture detected by the sensor 104. The detected movement may then be correlated with the library 300 for translating into a user interface action. This hand gesture may also be given context relative to the status of the user interface, as the same gesture may have multiple meanings depending on the context of the UI.

As described in further detail below, as the user interacts with the sensor 104, the processing device 102 translates the gestures into interface commands. Via the output display, the user receives visual feedback showing execution of operations based on the hand gesture commands.

As described in further detail below, sensor technology provides for receipt of user gestures as inputs commands to the display device. Via processing operations and a visual user interface, a gesture has multiple meanings depending on the state of the user interface. Therefore, the processing device interprets the gestures relative to a gesture context, determining a gesture context value for a corresponding interface command.

Figure 13:
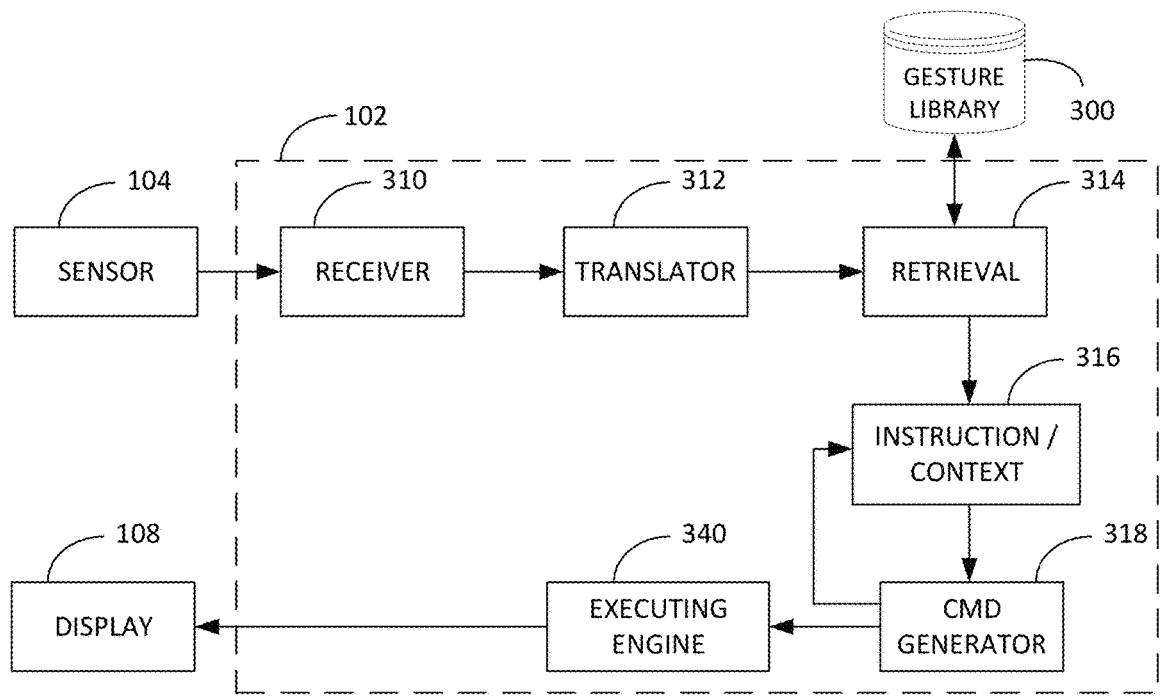
FIG. 13 illustrates a processing system providing for gesture-based UI controls.
Figure 14:
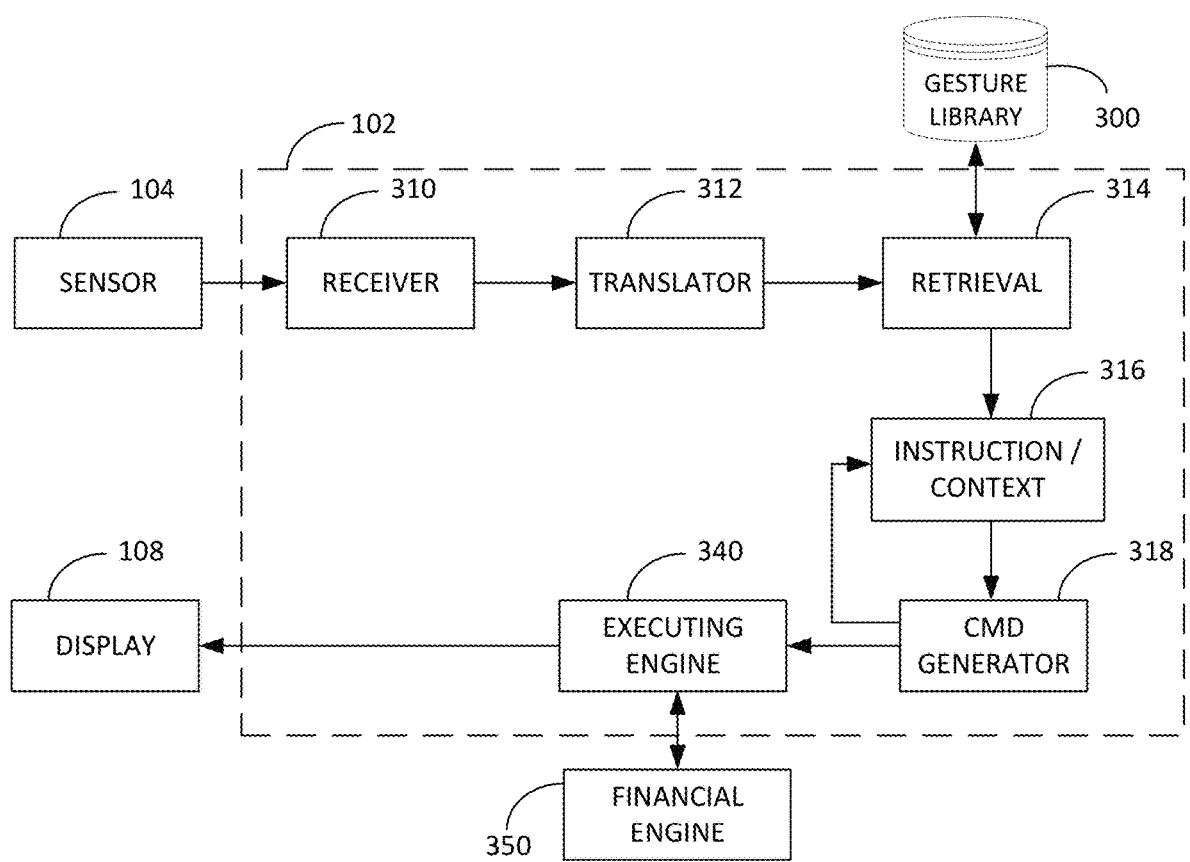
FIG. 14 illustrates an alternative embodiment of a processing system providing for gesture-based UI controls.

FIG. 13 illustrates a block flow diagram of one embodiment of the gesture-control. The sensor 104 recognizes a user gesture and provides the recognized gesture to a receiver 310, which is then translated by translator 312 into a form usable for accessing the gesture library 300 via the retrieval engine 314. Processing the gesture then determines an underlying instruction or context 316. A command generator 318 uses a context value for generating instruction(s).

The command generator 318 generates the command for the executing engine 340 to perform a specific operation. For example, if the gesture is to move from one menu level to another, the executing engine can be instructed to generate the next menu level as well as send an updated display instruction to the display 108.

FIG. 4 illustrates a similar engine, but further embodiments utilize external systems accessible via the processing device 104, engaging these systems via the user interface. For example, FIG. 4 includes the processing device being in operative communication with a financial engine 350. As used herein, operative communication may include any communication technique, including intermediary or third-party connections allowing for communication between the processing device 104 and a system that enables financial transactions. For example, if the user wishes to purchase an item via the display device 108 using the sensor-based UI, the executing engine 340 may transfer selection or authorization instructions. In one embodiment, the purchase may be authorized to display one or more works of art.

It is recognized that any number of sensors 104 may be utilized, including for example a camera with facial recognition software. Such sensors may interoperate with other sensors, such as engaging in a commercial transaction via the financial engine 350 via the gesture-based interface, but providing financial authorization via facial recognition software.

Figure 15:
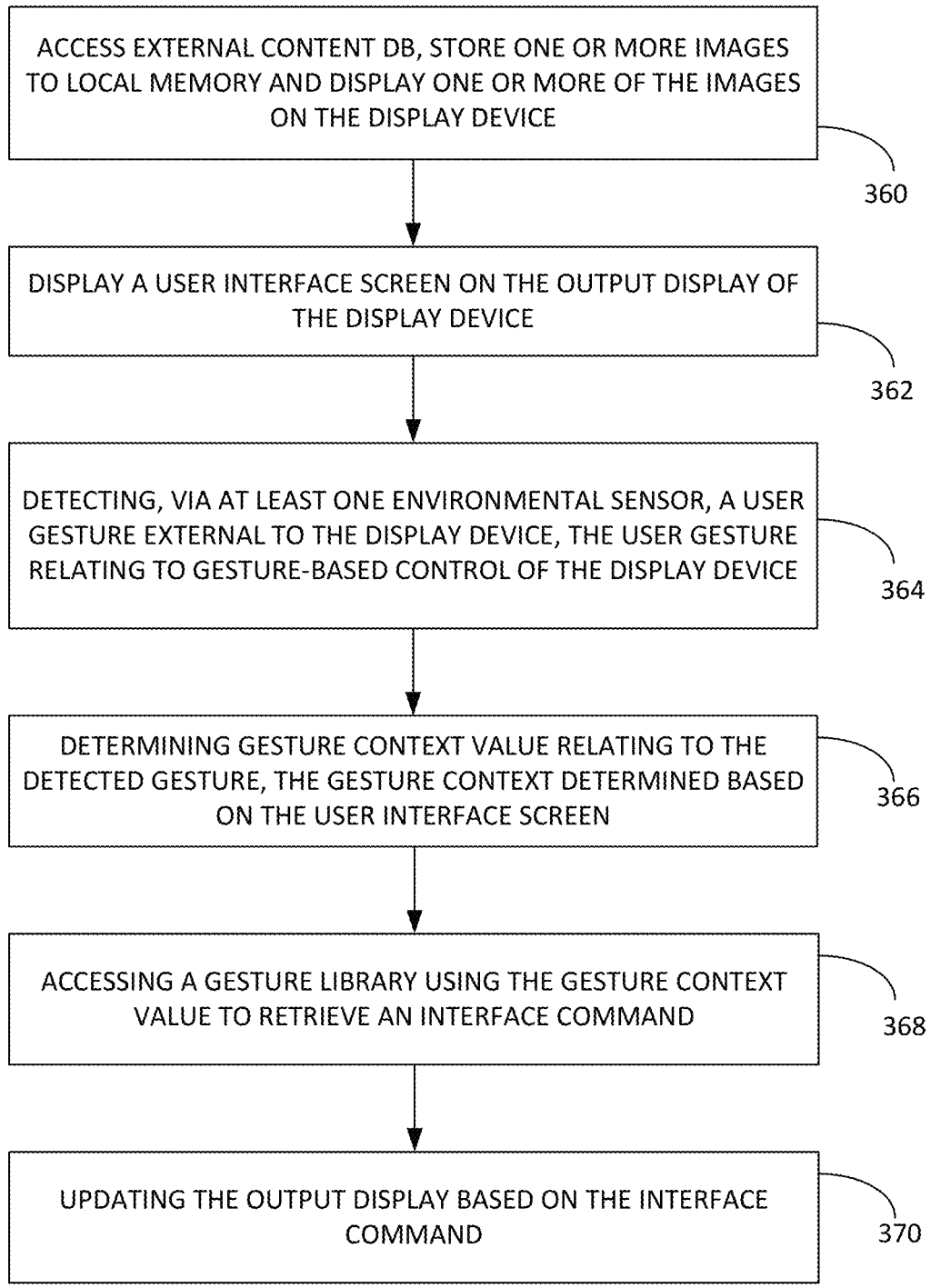
FIG. 15 illustrates a flowchart of the steps of one embodiment of a processing environment for a display device having gesture-based UI controls therewith.

FIG. 15 illustrates a flowchart of one embodiment of a method for gesture-based UI of a display device. Similar to the above-described display device, step 360 is displaying one or more images on the output display, the images being retrieved from a local memory. For example, the display may include cycling through a pre-selected grouping of images, such as rotating images at user-selected or preset time intervals.

Step 362 is displaying a user interface screen on the output display. For example, this step may include activating the user interface screen based on a menu activation gesture. The display of the user interface screen may be in an overlay, allowing for continued viewing of the displayed image with the interface menu in a portion of the screen. The interface menu may include a number of menus and sub-menus for user navigation, with commands or instructions as different menu, sub-menu levels.

Step 364 is to detect a user gesture relating to the gesture-based control of the display device. For example, a gesture may be a hand movement in the direction for menu navigation, such as an upward hand swipe indicated upward menu scrolling. Detected movements may include hand movement, full arm movement, full body movement, and/or facial movement. Detected movements may include movement from one or more individuals in proximity to the display. Detected movements may represent binary instructions or more complex contextual instructions such as emotional reactions, preferences, and group-based reactions.

For example, in varying embodiments, the sensor may be placed within the frame itself, on the exterior of the frame, behind the frame or fully external to the frame. For example, in one embodiment a sensor may be embedded directly within a frame holding the digital display. In another embodiment, a sensor may be connected to the frame, such as sitting atop or attached to the bottom of the frame. In another embodiment, the sensor may be entirely external to the frame, such as being separately mounted or placed next to the frame. In another embodiment, the sensor may be associated with another device such as a smart phone or mobile computing/tablet device, having motion recognition or detection technology. For example, one a smart phone, an application may be execute allowing for hand gesture as user interfacing, with the output of the gesture inputs transmitted to the display device and the results displayed thereon.

Step 366 is determining a gesture context value relating to the detected gesture, this context value based on the user interface screen. As noted above, a single gesture can have multiple meanings, different meanings dependent upon the interface context. Using the above example of an upward swipe, this can indicate scrolling within a menu, selecting a new menu, selecting or activating a menu command, closing the user interface, etc.

Step 368 is then accessing a gesture library using the gesture context value to retrieve an interface command. In one example, if the gesture is a downward swipe to indicate scrolling down a menu, the gesture is the downward swipe and the gesture context value is the menu on display with underlying menu terms or values. Then, the gesture library can reference based on the gesture, here a downward swipe, and the gesture context value being an active menu display, the action is command is to scroll the menu to the next menu item.

Step 370 is then updating the output display. The update of the output display may be updating the display relating to an image, such as changing image display values, e.g. color, tint, brightness, etc. The updating of the output display can be adjusting the menu or sub-menu display, such as scrolling to another menu option or activating a menu option the scroll to sub-menu options. In another example, if the instruction is to select a menu option to turn off the display (sleep), once the instruction is recognized the display is then turned off. In another example, if the instruction is to scroll left within a menu, the menu display is then scrolled left on the display.

In one embodiment, the user interface may include navigation of multiple thumbnails of images available for display. A thumbnail is a small-scale representation of the overall image. For example, a list of available images may include a visual representation of multiple thumbnails in series. User gestures can include swiping left or swiping right to scroll the thumbnails. Then, for example, an upward swipe may indicate an activation context for image selection, causing the image to then be on full display.

Figure 16A:
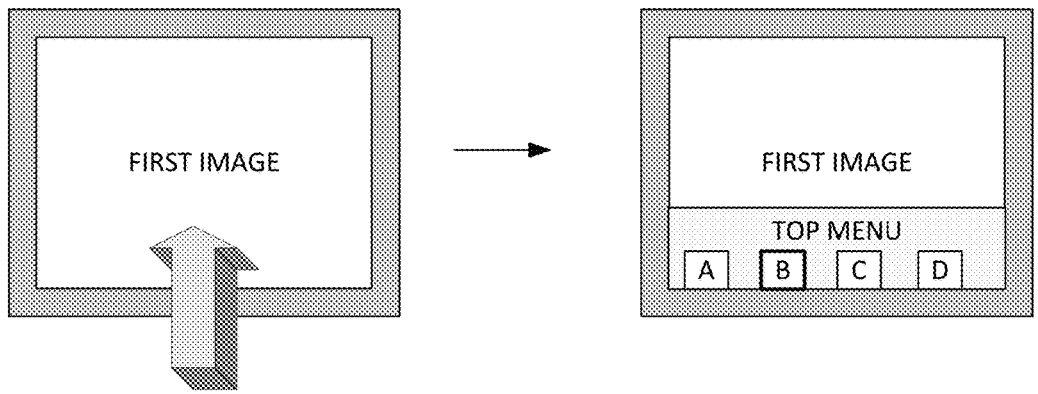
FIGS. 16A-16D illustrate exemplary hand gesture user interface functionalities with a digital display.

FIG. 16A illustrates a representation of a display device showing a first image, such as a photograph, a digital representation of a painting, etc. The designated arrow represents the direction of the user gesture, in this case being an upward movement gesture. For example, the gesture is a user swiping a hand in front of the sensor. In this example, the upward gesture is recognized by the user interface to engage an onscreen menu, the display now shows the first image and a top menu overlay, the top menu having a variety of selection options. For simplicity the selection options are abbreviated as option A, B, C, and D.

In one example, the option elements may represent different images for display, the option elements displaying thumbnails of the larger image. Thus, in the menu of FIG. 16A, the user could select to change images on the display device using gestures.

Figure 16B:
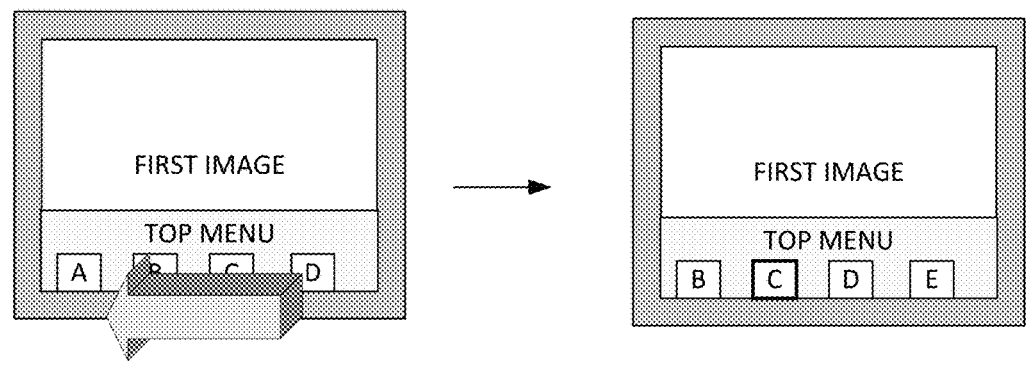

FIG. 16B illustrates a sample interaction for scrolling the top menu to the left by making a sweeping gesture to the left. Again, this may be performed using a hand waved in front of the sensor. The menu scrolling this moves the indicator selection to box C, scrolls box A off the screen and adds box E, as visible in the right-side display. This is all displayed in overlay with the first image partially occluded.

Figure 16C:
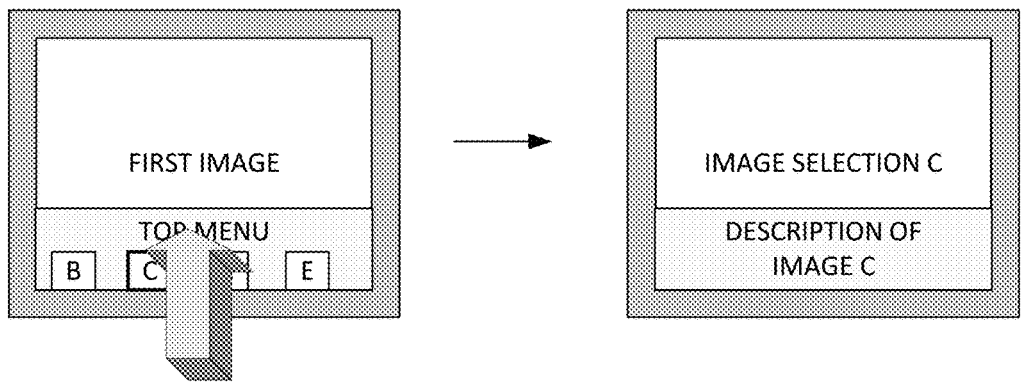

FIG. 16C illustrates a next step in the UI, here selecting image C. By an upward gesture in front of the sensor, the UI recognizes the selection of image C. Thus, the display behind the top menu overlay is changed from the first image to image selection C, as represented on the right-side screen. Also, in one embodiment, as the Image C is selected, the top menu can then change to a text description of the image.

Figure 16D:
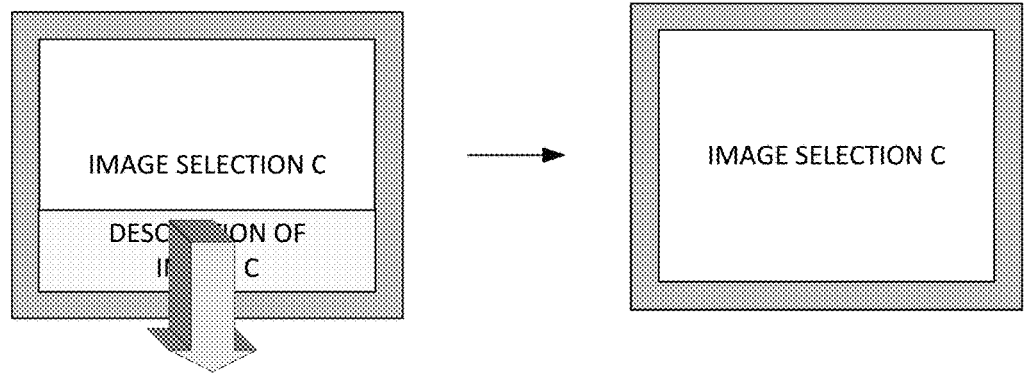

FIG. 16D illustrates a final UI gesture to close the menu. Here, the gesture is a downward movement in front of the sensor, indicating the closing of the menu. The right-side display shows the removal of the overlay window.

The above example is one simple example of user interactivity via a gesture recognition sensor. It is recognized that any number of variations of menus, submenus may be utilized. Moreover, any variety of types of gestures can be utilized, including activities beyond menu navigation, including for example financial transactions. For example, if a user navigates to a menu requiring verification for financial considerations, gesture(s) can be the verification, or utilizing other sensors such as a facial recognition or camera to finalize verification.

As described herein, the gesture recognition operates based on user gestures in front of or detectable by a sensor. The sensor may be disposed on, in or with the digital display and/or frame, but further embodiments are within the scope herein. For example, the sensor can be untethering from the display and/or frame, and may use any number of different sensors disposed at various locations. By way of example, a smart phone may include multiple sensors and an application (app) running thereon, for recognizing gestures and user interactivity. The smart phone, via known technology, can then communicate the gesture instructions with the display device. In the example of a smart phone or tablet computer running an app, the interactivity can be via the smart phone display and/or the display device. The result is the user interacting with the display device using gestures.

Further varying embodiments of sensors and sensor placement are within the scope herein. For example, in interconnected homes, offices, spaces, there are numerous mounted or stationary devices allowing for user interactivity. For example, a networked smoke detector or thermostat can include sensors with motion detection. Current internet-connected smoke detectors detect when a user enters a dark room, and can provide minimal ambient lighting. These sensors or inclusion of further sensors could also detect user movements, such as a gesture to turn on/off a digital display, a gesture to change displays, etc.

It is further noted that there is no specific limitation to types of user gestures. Any gesture capable of being recognized can have an instruction associated therewith. Additionally, the utilization of various sensors eliminates proximity requirements between a user and the sensor. The gestures can also be group gestures or animated in nature. For example, gestures can be collective detection of movement, such as detection of a group of people dancing, rapid movement indicating a mood or other type of feedback or instruction to the display device. In another example, the gesture can be a literal thumbs-up or thumbs-down, recognized as approval/disapproval, respectively.

In another example, arm movements can provide gesture instructions, such as moving hands/arms outward indicates enlarging or expanding an image, moving hands/arms inward indicates zooming in on an image, rotating hands/arms can indicate rotating an image or the display of image, etc.

In general, the present invention expands upon a digital display device, picture frame, by inclusion of multiple sensors detectable of user gestures. The processing device processes these gestures for direct user interactivity with the display, including functionality for engagements external to the display system, such as accessing third-party functionality, sites, e.g. financial transactions. The system uses any number of available sensors and the variety of sensors enables any suitable type and recognizable type of user or users' gestures as input.

The system for intelligently receiving and displaying digital visual content presents digital visual content in an environmentally optimized and relevant manner. It creates a new platform for presenting images, videos, etc. based on external stimuli. It converts local physical and digital information in order to present a better device for artistic, decorative, informational, and other important purposes.

FIGS. 1 through 16 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

The invention claimed is:

1. A method for interacting with a display device, the method comprising:
    accessing a content database external to the display device, the content database having images stored therein;
    storing a plurality of the images to a local memory device associated with the display device;
    displaying a user interface screen on the output display of the display device;
    displaying a plurality of image thumbnails within the user interface screen, the plurality of image thumbnails relating to the plurality of images stored in the local memory device;
    detecting, via at least one environmental sensor, a plurality of user gestures external to the display device, the user gestures relating to gesture-based control of the display device;
    determining gesture context values relating to the detected gestures, the gesture context values determined based on the user interface screen;
    for each of the gesture context values, retrieving interface commands from a gesture library;

navigating between image thumbnails on the display device in response to one or more of the interface commands;

in response to one or more of the interface commands, selecting a plurality of images for display;

receiving, via at least one of the user gestures, time interval instructions for cycling display of the selected plurality of images; and updating the output display based on the interface command including displaying the selected plurality of images one at a time by cycling through the selected plurality of images for display one at a time, each of the selected plurality of images being actively displayed for a period of time defined by the time interval instructions received via the user gestures.

2. The method of claim 1, wherein displaying the user interface screen on the output display of the display device includes displaying a first menu of user-interface commands, the method further comprising:

detecting a direction of motion of the user gesture; and navigating within the first menu based on the direction of motion of the user gesture.

3. The method of claim 2, wherein a first direction of the motion of the user gesture provides for navigating the first menu to display a second menu of the first menu.

4. The method of claim 2, wherein a first direction of the motion of the user gesture provides for navigating from a first choice in the first menu to a second choice in the first menu.

5. The method of claim 2, wherein a first direction of the motion of the user gesture provides for selecting of a first choice in the first menu.

6. The method of claim 1 further comprising:

detecting a sleep gesture based on the user gesture and a menu item; and putting the display device to inactive mode by disabling the output display based on the sleep gesture.

7. The method of claim 1, wherein the at least one environmental sensor is a camera, the method comprising:

detecting the user gesture using image recognition.

8. The method of claim 1, wherein the at least one environmental sensor is an electronic field sensor, the method comprising:

detecting user gesture based on a disruption in a nearby electronic field.

9. The method of claim 1, wherein the at least one environmental sensor is an infrared sensor, the method comprising:

detecting user gesture based on reflection of infrared light.

10. The method of claim 1 further comprising:

engaging in a commercial transaction with the user via the display device;

accessing a financial services processing system external to the display device; and verifying user acknowledgement of the commercial transaction using a user gesture detected by the at least one environmental sensor.

11. The method of claim 10, wherein the at least one environmental sensor is a camera, the method comprising:

verifying the user acknowledgement using facial recognition.

12. A method for interacting with a display device; the method comprising:

accessing a content database external to the display device, the content database having images stored therein;

storing a plurality of the images to a local memory device associated with the display device and storing a plurality of thumbnails relating to the plurality of images;

detecting, via at least one environmental sensor, a first user gesture external to the display device;

activating and displaying a user interface screen on the output display of the display device;

detecting a second user gesture external to the display device; in response to the second user gesture, displaying the plurality of image thumbnails within the user interface screen, the plurality of image thumbnails relating to the plurality of images stored in the local memory device;

detecting a plurality of further user gestures external to the display device; and in response to the further user gestures, selecting two or more of the plurality of images for display on the display device, the selecting based on selecting corresponding image thumbnails;

receiving time interval instructions via at least one of the user gestures for cycling display of the selected plurality of images; and displaying the selected plurality of images and cycling through the selected plurality of images for display one at a time, each of the selected plurality of images being actively displayed for a period of time defined by the time interval instructions received via the user gestures.

13. The method of claim 12, wherein the user interface screen on the output display includes a first option in a first menu, the method further comprising:

determining a first gesture context for the first user gesture; and updating the user interface screen by displaying at least one of: a second option in the first menu, and a second menu.

14. The method of claim 12, wherein the display of the user interface screen in a visual overlay on the display device.

15. The method of claim 12 further comprising:

determining a thumbnail navigation gesture in response to the output display of the first thumbnail;

determining gesture context value relating to the detected gesture, the gesture context value indicating at least one of: thumbnail scroll direction command and an activation command; and if the gesture context value indicates thumbnail scroll, update the output display to display a second thumbnail of the plurality of thumbnails.

16. The method of claim 12 further comprising:

concurrent with the display of the first thumbnail, displaying textual information relating to the image represented by the thumbnail.

17. The method of claim 12 further comprising:

engaging in a commercial transaction with the user via the display device, the commercial transaction relating to authorization for display of at least one image on the display device;

accessing a financial services processing system external to the display device; and verifying user acknowledgement of the commercial transaction relating to authorization for display of the at least one image using a fourth user gesture detected by the at least one environmental sensor.

18. The method of claim 12, wherein the environmental sensor includes at least one of: a camera, an electronic field sensor, and an infrared sensor.

* * * * *